Oct. 2, 1928.  
F. Y. McKENNEY  
1,686,459  
DIRIGIBLE HEADLIGHT  
Filed Aug. 18, 1927  
2 Sheets-Sheet 1
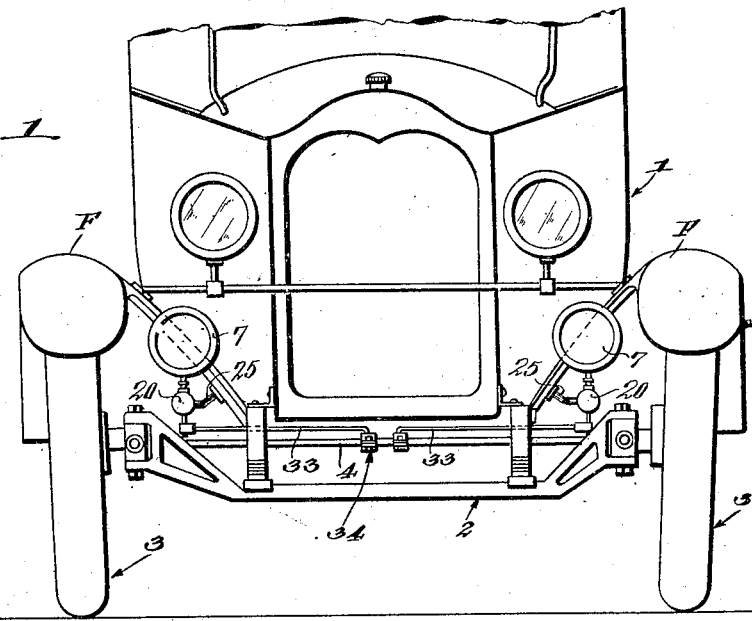
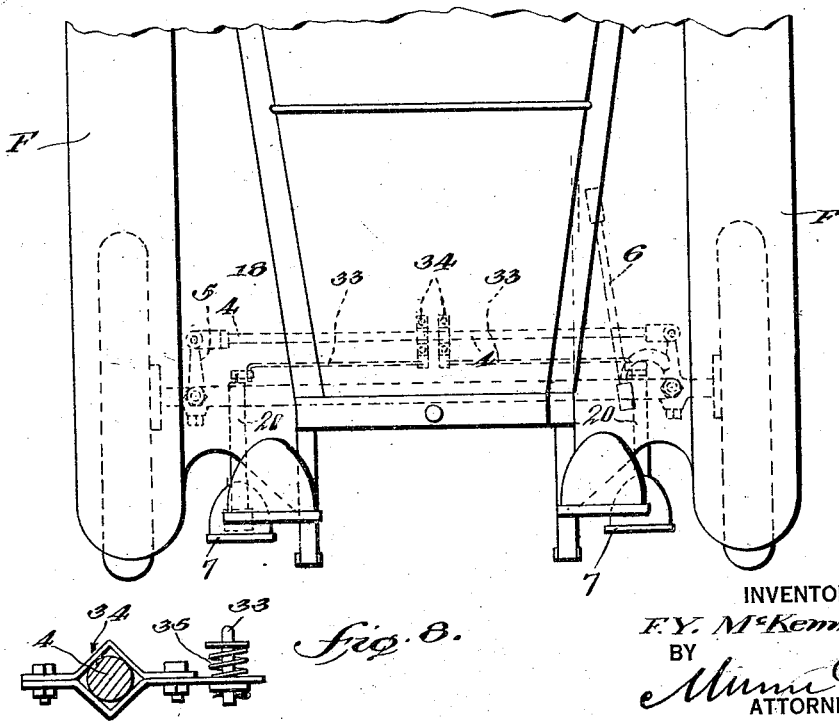
INVENTOR  
F.Y. McKenney,  
BY  
ATTORNEY Oct. 2, 1928.
F. Y. McKENNEY
1,686,459
DIRIGIBLE HEADLIGHT
Filed Aug. 18, 1927     2 Sheets-Sheet 2
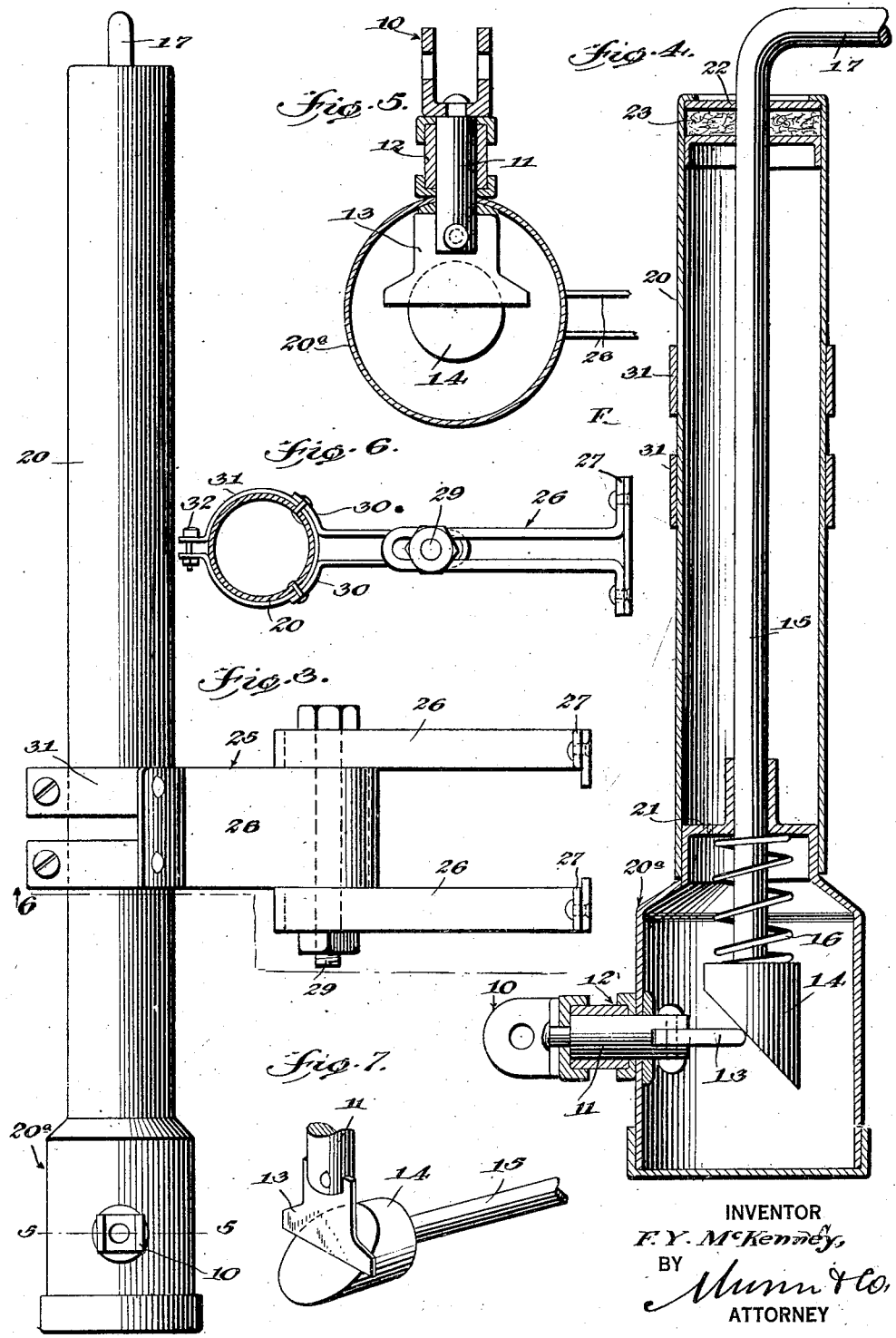
INVENTOR
F. Y. McKenney,
BY
Munn & Co,
ATTORNEY Patented Oct. 2, 1928.

1,686,459

UNITED STATES PATENT OFFICE.

FRED Y. McKENNEY, OF CHATTANOOGA, TENNESSEE, ASSIGNOR TO ROBERT C. LYNN, OF CHATTANOOGA, TENNESSEE.

DIRIGIBLE HEADLIGHT.

Application filed August 18, 1927. Serial No. 213,921.

This invention relates to dirigible headlights for automobiles and operating mechanism therefor.

A primary object of the invention is to provide a dirigible headlight and mechanism for operating it which is simple and durable, reliable and effective in operation, and easy and comparatively inexpensive to manufacture, and which imparts in a smooth and easy manner the proper movement to the headlights when the vehicle is steered while taking up within itself the movement occasioned by the flexion of the springs and the movement set up by vibration.

Another object of the invention is to provide automatic means for controlling the headlights on automobiles or other vehicles, which will turn the lamps so as to throw their rays constantly in the direction of the vehicle's progressive movement, and thus illuminate the roadway in front of the same.

In carrying out these objects, the invention is susceptible of a wide range of modification without departing from the spirit or sacrificing any of the advantages of the claimed invention; there being shown in the drawings for illustrative purposes a preferred and practical form, in which:

Figure 1 represents a front elevation of a front end of an automobile with these improved headlights shown applied;

Fig. 2 is a plan view thereof,

Fig. 3 is an enlarged detail plan view of one of the lamp operating devices shown detached, Fig. 4 is a longitudinal sectional view thereof taken on the line 4—4 of Fig. 3, Fig. 5 is a transverse vertical section taken on the line 5—5 of Fig. 3, Fig. 6 is a transverse section taken on the line 6—6 of Fig. 3 with the mounting brackets shown in elevation, Fig. 7 is a detail perspective view showing the cam member for actuatng one of the headlights in engagement with the plate carried by the shank or stem of the light, the latter being broken off for convenience in illustration, Fig. 8 is a detail sectional view of the clamp used for holding the tie rod to the steering gear.

In the embodiment illustrated, a portion of an automobile is designated 1 and has a front axle 2 to which the steering wheels 3 are connected in the usual way. The usual tie rod 4 is provided between the arms 5 which are connected to the steering wheels and the usual drive means or connecting rod 6 connects with one of said arms 5 and is actuated from the steering wheel by a conventional motion transmission means, not shown.

The automobile has the usual fixed headlights 7, and the auxiliary lights 7ª each of which latter is fixed to a lamp clasp or clamp 10, which is equipped with a shaft 11 rotatably fitted in a bearing 12 carried by a shell or housing 20. A lever 13 is carried by the shaft 11, and is adapted to be engaged by a cam 14 for rotating the lamps in a manner presently to be described.

The cam 14 is carried by a rod or shaft 15 journaled in a partition 21 at one end of the shell and in the other end of the shell as shown at 22, a felt washer 23 being arranged at this end of the shaft to prevent water and dust from entering the shell and which is also designed to lubricate the shaft 15 and the shell, oil being supplied thereto for this purpose.

A coiled spring 16 is mounted on the shaft 15 between the cam 14 and the partition 21 and operates to retain the cam in position against the lever 13 and also to compensate for wear between the lever and the cam.

The shaft 15 has its outer end beyond the shell extended at right angles and threaded whereby adjustments may be made, and said shaft end also operating as a part of a universal joint.

The shells 20 are mounted under the fenders F by means of adjustable brackets 25 each shown in the form of two loop-like or U-shaped arms 26 having out-turned laterally extending feet 27 which are clamped to the fender brace under the fender. These loop-like arms 26 are spaced laterally apart and have located between them a loop-shaped plate 26ª the loop portion of which registers with the loop portions of the arms and through which extend an adjusting bolt 29. This plate 28 has its ends bent laterally outward in opposite directions as shown at 30, and these bent ends are riveted or otherwise secured to a split clamping ring 31 which encircles the shell 20 and is adjustably secured thereto by clamping bolts 32 so that said ring may be adjusted longitudinally and peripherally on the shell.

The universal joint block 18 connects the lower end of the shaft 17 with a tie rod 33.

This tie rod 33 extends substantially parallel with the steering gear tie rod 4 and is attached thereto preferably about midway of the steering gear rod 4 by means of a clamp 34. This clamp 34 is shown in detail in Fig. 8 of the drawings, and has a spring connection with the tie rod 33 as shown at 35 which permits motion of the tie rod and avoids rattling.

It is of course understood that the mechanism above described is duplicated at each side of the automobile for controlling the two headlights employed on vehicles.

From the above description, it will be obvious that when the front steering wheels 3 of the vehicle are turned in one direction, the steering rod 4 thereof will impart its motion to the tire rods 33 and through the rod 15 and the cam head 14 connected at the front ends thereof and operate to turn through the members 13, the lamps 7' so that these lamps will throw the light in the direction in which the wheels 3 may be steered.

It will be seen that the coiled spring 16 normally exerts its tension to force the cam head 14 in engagement with the member 13 so that these parts will turn in unison, the head 14 operating to push the plate-like lever 13 around when the rod 15 is rotated and thereby turn the headlights 7' with the steering wheels of the vehicle. These dirigible headlights 7' are designed to supplement the fixed lights 7 and to throw the light in the direction the vehicle is turned.

Without further description it is thought that the features and advantages of the invention will be readily apparent to those skilled in the art, and it will of course be understood that changes in the form, proportion and minor details of construction may be resorted to, without departing from the spirit of the invention or its scope as claimed.

I claim:—

1. Operating mechanism to swing a dirigible headlight from the swinging arm of the steering gear of an automobile comprising a tie rod, a connection between said tie rod and steering gear, a lamp support, a rotary member depending from and fixed to said lamp support, cam means located in the path of said rotary member and connected with said tie rod whereby actuation of the steering gear will operate to turn said lamp support in the direction in which the gear is turned.

2. Operating mechanism to swing a dirigible headlight from the swinging arm of the steering gear of an automobile comprising a tie rod, a connection between said tie rod and steering gear, a lamp support mounted to rotate, a member fixed to and depending from said support, a cam located in the path of said member, and a connection between said cam and said tie rod whereby turning of the steering gear will operate to simultaneously turn the lamps in the same direction.

3. Operating mechanism to swing a dirigible headlight from the swinging arm of the steering gear of an automobile comprising a tie rod, a connection between said tie rod and steering gear, a lamp support, rotatably mounted and having a member depending therefrom, a cam located in the path of said member, a rod connected with said cam, a universal joint between said rod and said tie rod, and resilient means for yieldably holding said cam in engagement with said member, whereby said member will be turned on the turning of the steering gear and wear between said member and cam provided for.

4. Operating mechanism to swing a dirigible headlight from the swinging arm of a steering gear of an automobile comprising a tie rod, means connecting said tie rod with said steering gear, said connecting means having means for transmitting the horizontal swinging movement of the steering gear to the rod while affording up and down and back and forth movement thereof, a lamp support rotatably mounted, a member depending from said support, a cam located in the path of said depending member and means connecting said cam with said tie rod whereby the turning of said steering gear will operate to rotate the lamp.

FRED Y. McKENNEY.